(12) United States Patent
Kashima et al.

(10) Patent No.: US 8,341,480 B2
(45) Date of Patent: Dec. 25, 2012

(54) METHOD AND APPARATUS FOR PROVIDING IMPLICIT NEGATIVE ACKNOWLEDGEMENT

(75) Inventors: Tsuyoshi Kashima, Tokyo (JP); Esa Malkamaki, Espoo (FI)

(73) Assignee: Nokia Corporation, Espoo (FI)

( * ) Notice: Subject to any disclaimer, the term of this patent is extended or adjusted under 35 U.S.C. 154(b) by 266 days.

(21) Appl. No.: 12/667,034

(22) PCT Filed: Jun. 25, 2008

(86) PCT No.: PCT/IB2008/052540
§ 371 (c)(1),
(2), (4) Date: Jul. 12, 2010

(87) PCT Pub. No.: WO2009/001305
PCT Pub. Date: Dec. 31, 2008

(65) Prior Publication Data
US 2011/0047429 A1    Feb. 24, 2011

Related U.S. Application Data

(60) Provisional application No. 60/946,315, filed on Jun. 26, 2007.

(51) Int. Cl.
*G06F 11/00* (2006.01)
(52) U.S. Cl. .......................... 714/748; 714/749
(58) Field of Classification Search .................. 714/748, 714/749, 750, 751, 752
See application file for complete search history.

(56) References Cited

U.S. PATENT DOCUMENTS

| | | | |
|---|---|---|---|
| 8,068,511 B2 * | 11/2011 | Reznik et al. | 370/447 |
| 2001/0044195 A1 * | 11/2001 | Gris et al. | 438/522 |
| 2005/0176437 A1 | 8/2005 | Mir | |
| 2006/0013257 A1 * | 1/2006 | Vayanos | 370/473 |

FOREIGN PATENT DOCUMENTS

EP    1515474 A    3/2005

OTHER PUBLICATIONS

International Search Report and Written Opinion received in corresponding Patent Cooperation Treaty Application No. PCT/IB2008/052540, Dec. 30, 2008, 12 pages.
3GPP TR 25.814 V1.2.0, "Technical Specification Group Radio Access Network; Physical Layer Aspects for Evolved UTRA", Release 7, Feb. 2006, 84 pages.
Nokia, "Uplink Synchronisation Recovery", 3GPP TSG-RAN WG2 #55, R2-062768, Seoul, South Korea, Oct. 9-13, 2006, 3 pages.
"3$^{rd}$ Generation Partnership Project; Technical Specification Group Radio Access Network; Physical Layer Aspects for Evolved UTRA (Release 7)", 3GPP TR 25.814 V1.5.0, May 2006, 125 pgs.

(Continued)

*Primary Examiner* — Dieu-Minh Le
(74) *Attorney, Agent, or Firm* — Harrington & Smith (57) ABSTRACT

An approach is provided for utilizing implicit negative acknowledgement. A determination is made that a user equipment is out of synchronization (e.g., with respect to the uplink). A control signal specifying timing alignment information is generated for transmission to the user equipment. An implicit negative acknowledgement corresponding to retransmission of data is declared if an acknowledgement is not received within a predetermined time interval.

20 Claims, 9 Drawing Sheets

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7.0.0, Jun. 2006, 39 pgs.

"3rd Generation Partnership Project; Technical Specification Group Services and System Aspects; 3GPP System Architecture Evolution: Report on Technical Options and Conclusions (Release 7)", 3GPP TR 23.882 V1.11.0, Jul. 2007; 211 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.0.0, Jun. 2010, 183 pgs.

* cited by examiner

METHOD AND APPARATUS FOR PROVIDING IMPLICIT NEGATIVE ACKNOWLEDGEMENT

RELATED APPLICATION

This application was originally filed as PCT Application No. PCT/IB2008/052540 on Jun. 25, 2008 and claims priority to U.S. Provisional Application No. 60/946,315 filed on Jun. 26, 2007, which is incorporated herein by reference in its entirety.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves control signaling to ensure efficient delivery of data.

SOME EXEMPLARY EMBODIMENTS

Therefore, there is a need for an approach for providing efficient signaling, which can co-exist with already developed standards and protocols.

According to an exemplary embodiment, a method comprises determining that a user equipment is out of synchronization. The method also comprises generating a control signal specifying timing alignment information for transmission to the user equipment. The method further comprises declaring an implicit negative acknowledgement corresponding to retransmission of data if an acknowledgement is not received within a predetermined time interval.

According to another exemplary embodiment, an apparatus comprises a synchronization module configured to determine that a user equipment is out of synchronization and to generate a control signal specifying timing alignment information for transmission to the user equipment. The apparatus also comprises an error detection module configured to declare an implicit negative acknowledgement corresponding to retransmission of data if an acknowledgement is not received within a predetermined time interval.

According to another exemplary embodiment, a method comprises receiving a control signal during an out of synchronization state, wherein the control signal specifies timing alignment information. The method also comprises performing an error check on the control signal. Further, the method comprises, if the error check passes, adjusting synchronization and generating an acknowledgement message.

According to another exemplary embodiment, an apparatus comprises a synchronization module configured to receive a control signal during an out of synchronization state, wherein the control signal specifies timing alignment information. The apparatus also comprises an error detection module configured to perform an error check on the control signal, wherein, if the error check passes, synchronization is adjusted and an acknowledgement message is generated.

According to another exemplary embodiment, a method comprises receiving a control signal during an out of synchronization state, wherein the control signal specifies timing alignment information. The method also comprises decoding the received control signal. Further, the method comprises, if the decoding is successful, adjusting synchronization and generating an acknowledgement message.

According to yet another exemplary embodiment, an apparatus comprises logic configured to receive a control signal during an out of synchronization state, wherein the control signal specifies timing alignment information, wherein the logic is configured to decode the received control signal. If the decoding is successful, synchronization is adjusted and an acknowledgement message is generated.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION

An apparatus, method, and software for providing implicit negative acknowledgement signaling are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
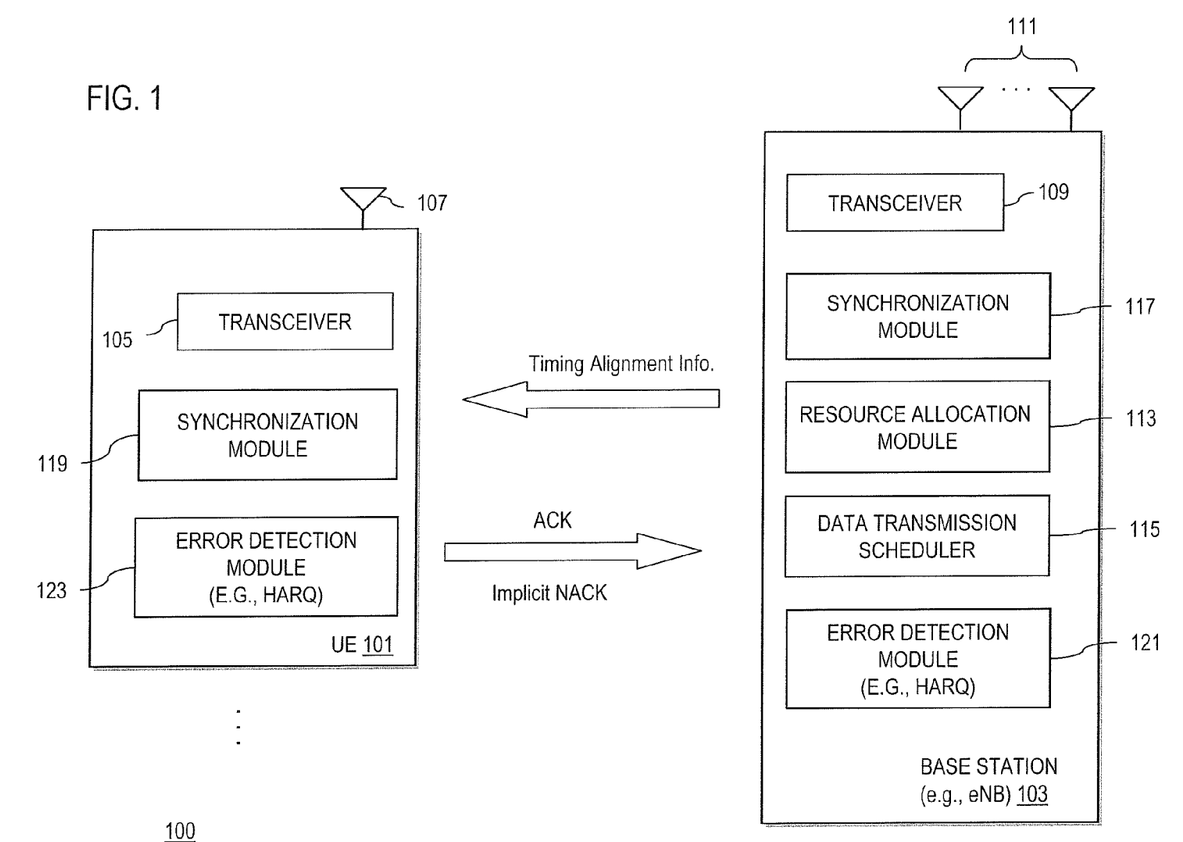
FIG. 1 is a diagram of a communication system capable of providing control signaling to support an error control mechanism when a user equipment is out of synchronization, according to an exemplary embodiment.

FIG. 1 is a diagram of a communication system capable of providing control signaling to support an error control mechanism when a user equipment is out of synchronization, according to an exemplary embodiment. As shown in FIG. 1, one or more user equipment (UEs) 101 communicate with a base station 103, which is part of an access network (e.g., 3GPP LTE (or E-UTRAN, etc.). Under the 3GPP LTE architecture (as shown in FIGS. 10A-10D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UE 101 includes a transceiver 105 and an antenna system 107 that couples to the transceiver 105 to receive or transmit signals from the base station 103. The antenna system 107 can include one or more antennas.

As with the UE 101, the base station 103 employs a transceiver 109, which transmits information to the UE 101. Also, the base station 103 can employ one or more antennas 111 for transmitting and receiving electromagnetic signals. For instance, the Node B 103 may utilize a Multiple Input Multiple Output (MIMO) antenna system 111, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GPP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

Communications between the UE 101 and the base station 103 (and thus, the network) is governed, in part, by control information exchanged between the two entities. Such control information, in an exemplary embodiment, is transported over a control channel on, for example, the downlink from the base station 103 to the UE 101. The system 100 provides an efficient signaling mechanism for assigning a dedicated random access preamble and timing alignment (TA) information. In an exemplary embodiment, the signaling is controlled by a resource allocation module 113, which is shown as part the base station 103; however, it is contemplated that the resource allocation module 113 can be implemented elsewhere on the network side. According to one embodiment, the allocated resources involve physical resource blocks (PRB), which correspond to OFDM symbols, to provide communication between the UE 101 and the base station 103. That is, the OFDM symbols are organized into a number of physical resource blocks that includes consecutive sub-carriers for corresponding consecutive OFDM symbols. To indicate which physical resource blocks (or sub-carrier) are allocated to a UE 101, two exemplary schemes include: (1) bit mapping, and (2) (start, length) by using several bits indicating the start and the length of an allocation block. This signaling of the start and the length will typically use joint coding (i.e., they are signaled using one code word, which contains the information for both parts).

A data transmission scheduler 115 operates in conjunction with the resource allocation module 113 to provide scheduling of data transmissions to the UE 101. According to one embodiment, a synchronization module 117 is employed in the eNB 103 to detect whether the UE 101 is in synchronization; the UE 101 also can determine whether it is out of synch through its own synchronization module 119.

In the standardization of LTE (e.g., RAN2), it is defined that the random access procedure takes two distinct forms: a contention based procedure and a non-contention based (applicable to only handover and DL data arrival). For example, uplink (UL) synchronization is performed via random access procedure. In the case of downlink (DL) data arrival to the UL-non-synchronized UE, eNB 103 can assign a dedicated random access preamble to the UE 101 so that the random access procedure can be performed without contention.

To ensure accurate delivery of information between the eNB 103 and the UE 101, the system 100 utilizes error detection to exchange information, e.g., Hybrid ARQ (HARQ). HARQ is a concatenation of Forward Error Correction (FEC) coding and an Automatic Repeat Request (ARQ) protocol. Automatic Repeat Request (ARQ) is an error detection mechanism used on the link layer. As such, this error detection scheme, as well as other schemes (e.g., CRC (cyclic redundancy check)), can be performed by error detection modules 121, 123 within the eNB 103 and UE 101, respectively. The HARQ mechanism permits the receiver (e.g., UE 101) to indicate to the transmitter (e.g., eNB 103) that a packet or sub-packet has been received incorrectly, and thus, requests the transmitter to resend the particular packet(s).

By way of example, a number of communication channels are defined for use in the system 100. The channel types include: physical channels, transport channels, and logical channels. Physical channels can include a physical downlink shared channel (PDSCH), a dedicated physical downlink dedicated channel (DPDCH), a dedicated physical control channel (DPCCH), etc. The transport channels can be defined by how they transfer data over the radio interface and the characteristics of the data. The transport channels include a broadcast channel (BCH), paging channel (PCH), a dedicated shared channel (DSCH), etc. Other exemplary transport channels are an uplink (UL) Random Access Channel (RACH), Common Packet Channel (CPCH), Forward Access Channel (FACH), Downlink Shared Channel (DLSCH), Uplink Shared Channel (USCH), Broadcast Channel (BCH), and Paging Channel (PCH). A dedicated transport channel is the UL/DL Dedicated Channel (DCH). Each transport channel is mapped to one or more physical channels according to its physical characteristics.

Each logical channel can be defined by the type and required Quality of Service (QoS) of information that it carries. The associated logical channels include, for example, a broadcast control channel (BCCH), a paging control channel (PCCH), Dedicated Control Channel (DCCH), Common Control Channel (CCCH), Shared Channel Control Channel (SHCCH), Dedicated Traffic Channel (DTCH), Common Traffic Channel (CTCH), etc.

The BCCH (Broadcast Control Channel) can be mapped onto both BCH and DSCH. As such, this is mapped to the PDSCH; the time-frequency resource can be dynamically allocated by using L1/L2 control channel (PDCCH). In this case, BCCH (Broadcast Control Channel)-RNTI (Radio Network Temporary Identities) is used to identify the resource allocation information.

In terms of the assignment of dedicated random access preamble, L1/L2 control signal can be used (although it is contemplated that Medium Access Control (MAC) layer signaling can alternatively be utilized). As for TA information signaling, both types of signaling can be specified in LTE. When UE 101 is in UL-synchronization and there is DL data, the TA information can be sent in DL MAC control signal. However, if UE 101 is not in UL-synchronization, or there is no DL data to be transmitted and no resource allocation, TA information can be sent via L1/L2 control signal for optimization.

System 100 provides for retransmission of a control signal over the downlink using implicit negative acknowledgement when the uplink is out of synchronization.

Figure 2:
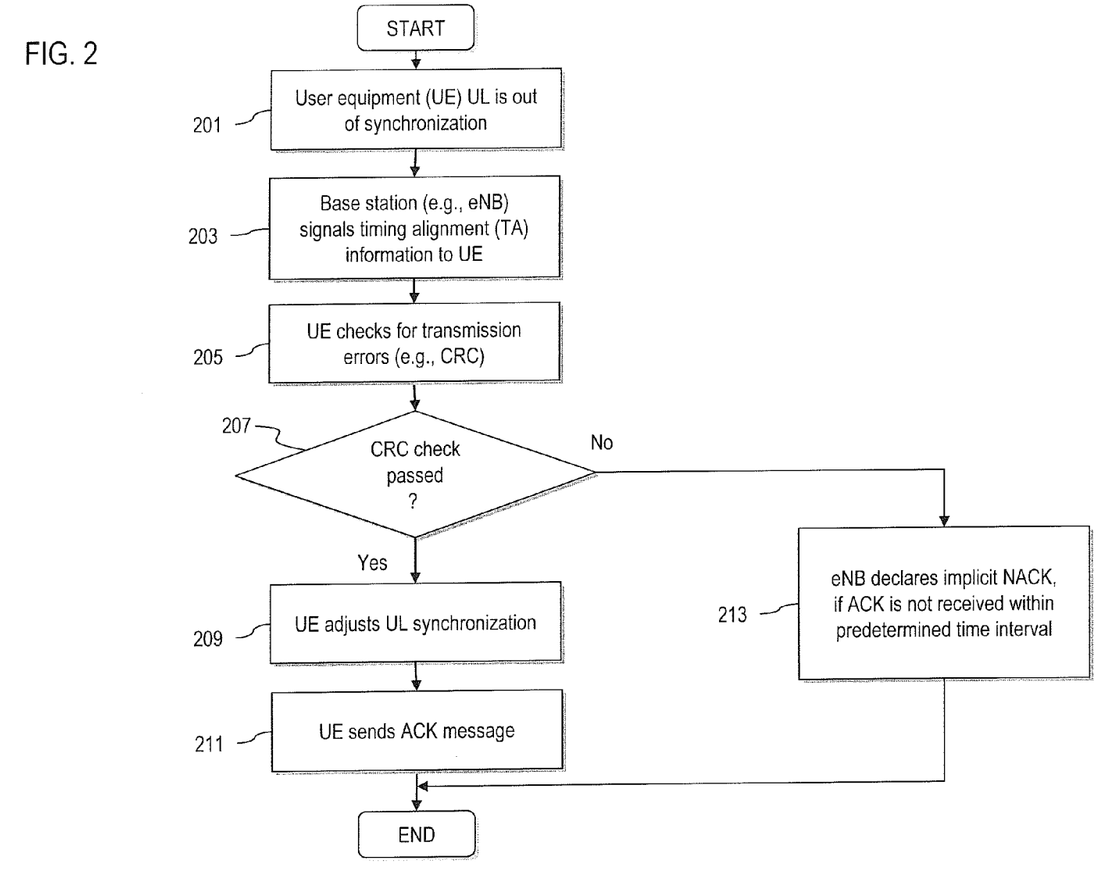
FIG. 2 is a flowchart of a process for providing implicit negative acknowledgement for retransmissions involving a check for transmission errors of a control signal, according to an exemplary embodiment.
Figure 3:
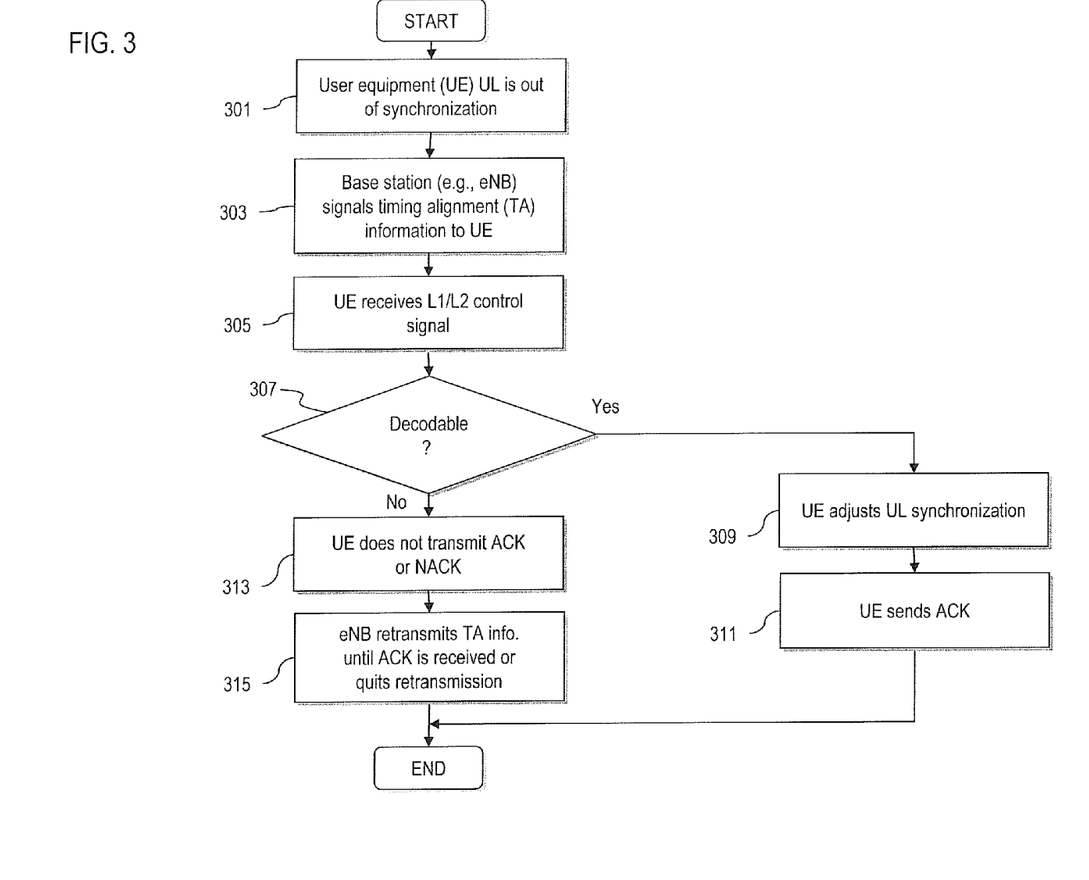
FIG. 3 is a flowchart of a process for providing implicit negative acknowledgement for retransmissions involving decoding a control signal, according to an exemplary embodiment.

FIGS. 2 and 3 are flowcharts of processes for providing implicit negative acknowledgement for retransmissions, according to an exemplary embodiment. Specifically, these processes provide implicit negative acknowledgement (NACK) (or NACK-less operation) for retransmission in DL transmission for a UE 101 that is out of uplink synchronization.

Specifically, FIG. 2 illustrates a control signaling mechanism that is applicable in a scenario with NACK-less DL HARQ in the downlink shared channel (DL-SCH). First, when the UE 101 is out of uplink synchronization (step 201), the eNB 103 can transmit a transport block containing control and data together with a Medium Access Control (MAC) control for timing alignment (TA) information to the UE 101 over the DL-SCH in the same manner as when the UE 101 is in uplink synchronization, per step 203. It is assumed that in UL synchronization control, both eNB 103 and UE 101 possess exact knowledge of whether the UE 101 is in uplink synchronization or not; for example, the synchronization modules 121, 123 can use explicit signaling or fully synchronized timer operation. In this process, when not uplink synchronized, the UE 101 can read the control signal (e.g., L1/L2 control signal) and receive the transport block in the DL-SCH as if the UE 101 were UL synchronized.

In step 205, the UE 101 checks for transmission errors. In one embodiment, per step 207, the UE 101 performs a cyclic redundancy check (CRC) on the received control signal. In the DL HARQ operation, if the cyclic redundancy check passes (as determined in step 207), and ACK (acknowledgement) is to be signaled, the UE 101 sends an ACK after adjusting UL synchronization by reading TA information (steps 209 and 211).

However, if the CRC check fails, and NACK is to be signaled, the UE 101 does not send any ACK/NACK. If eNB 103 does not receive an ACK within a predetermined time interval, the eNB 103 implicitly declares a NACK, as in step 213.

In the process of FIG. 2, if the UE 101 receives a transport block or L1/L2 control signal without TA information when the UE 101 detects that it is out of uplink sync, the UE does not send ACK in the UL.

FIG. 3 illustrates a scenario involving L1/L2 control signal retransmission. Under this scenario, the UE 101 is out of uplink synchronization (step 301). In step 303, the eNB 103 can transmit an L1/L2 control signal including a timing alignment (TA) information to the UE 101. Upon receiving the control signal (step 305), the UE 101 attempts to decode the information, as in step 307. If the UE 101 fails to decode the control signal, the UE 101 is not aware whether the signal is addressed to the UE 101 or not. Thus, the UE 101 does not transmit any type of acknowledgement (i.e., neither ACK nor NACK), per step 313. In this procedure, the eNB 103 is aware that the UE 101 may send an ACK if the UE 101 receives the TA information correctly. Thus, the eNB 101 retransmits, as in step 315, the same L1/L2 control signal containing TA information until the eNB receives ACK, or the eNB 103 decides to cease the retransmission.

If the UE 101 succeeds in decoding the control signal, the UE 101 adjusts its UL synchronization by reading TA information in L1/L2 control signal and sends an ACK by using, for example, a HARQ ACK/NACK channel (steps 309 and 311).

In one embodiment, with respect to UL synchronization control, only the eNB 103 knows whether the UE 101 is uplink synchronized. In this case, whether explicit NACK or implicit NACK is required can be indicated explicitly in L1/L2 control channel in case of FIG. 2. Also, whether an ACK is required or not can be indicated explicitly in L1/L2 control channel in case of FIG. 3.

With the above described processes, even when the UE 101 is out of uplink synchronization, the eNB 103 can send the timing alignment (TA) information using Medium Access Control (MAC) layer control with DL HARQ to achieve better reliability. Also, the eNB 103 can start the normal DL data transmission with MAC control for timing alignment information if needed, resulting in less delay.

In certain embodiments, the processes described above can be performed within an UMTS terrestrial radio access network (UTRAN) or Evolved UTRAN (E-UTRAN) in 3GPP, as next described.

FIGS. 4A-4D are diagrams of communication systems having exemplary long-term evolution (LTE) architectures, in which the user equipment (UE) and the base station of FIG. 1 can operate, according to various exemplary embodiments of the invention. By way of example (shown in FIG. 4A), a base station (e.g., destination node) and a user equipment (UE) (e.g., source node) can communicate in system 400 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 4A:
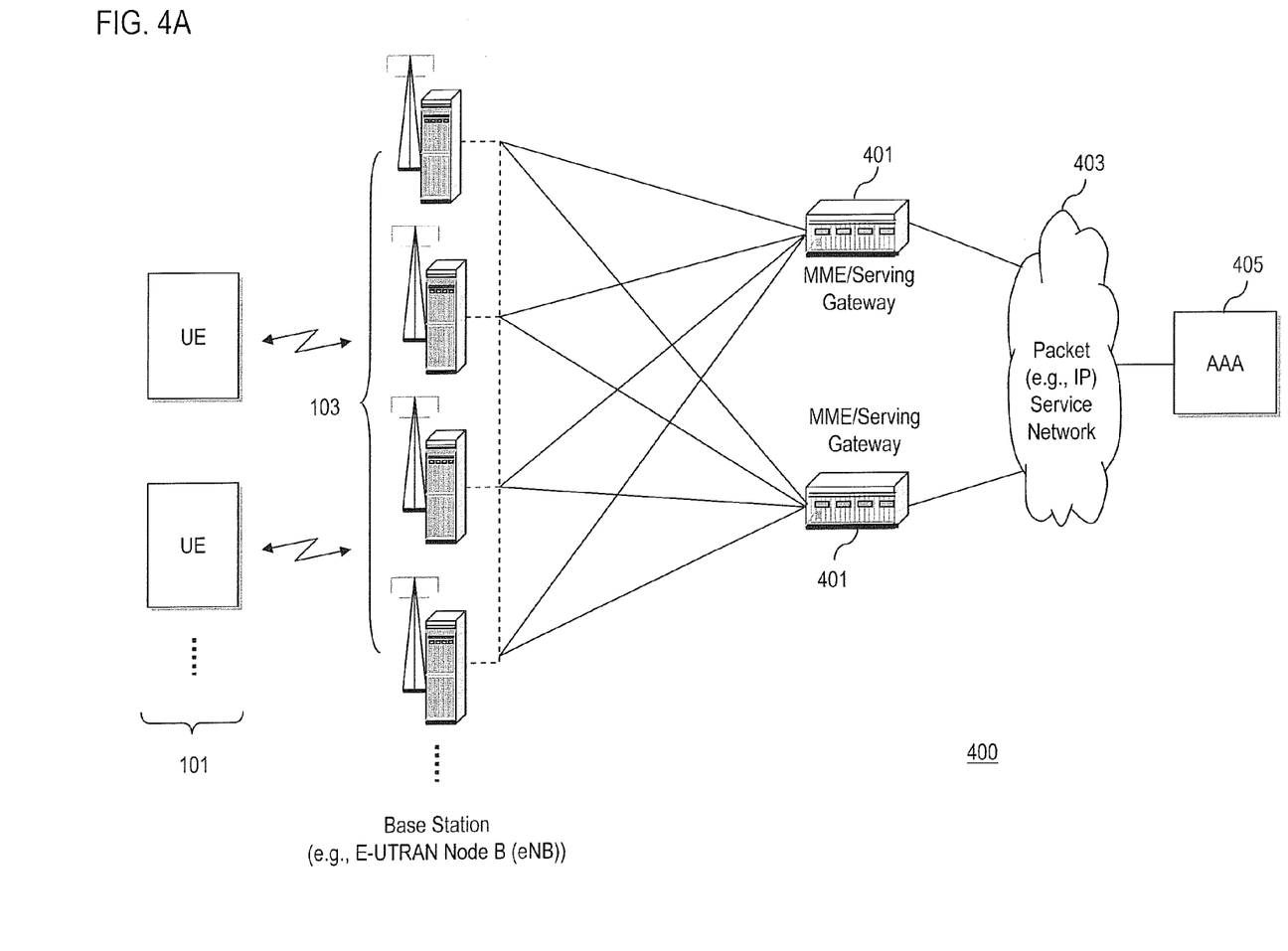
FIGS. 4A-4D are diagrams of communication systems having exemplary long-term evolution (LTE) and E-UTRA (Evolved Universal Terrestrial Radio Access) architectures, in which the system of FIG. 1 can operate to provide resource allocation, according to various exemplary embodiments of the invention.

The communication system 400 is compliant with 3GPP LTE, entitled "Long Term Evolution of the 3GPP Radio Technology" (which is incorporated herein by reference in its entirety). As shown in FIG. 4A, one or more user equipment (UEs) communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

MME (Mobile Management Entity)/Serving Gateways 401 are connected to the eNBs 103 in a full or partial mesh configuration using tunneling over a packet transport network (e.g., Internet Protocol (IP) network) 403. Exemplary functions of the MME/Serving GW 401 include distribution of paging messages to the eNBs 103, termination of U-plane packets for paging reasons, and switching of U-plane for support of UE mobility. Since the GWs 401 serve as a gateway to external networks, e.g., the Internet or private networks 403, the GWs 401 include an Access, Authorization and Accounting system (AAA) 405 to securely determine the identity and privileges of a user and to track each user's activities. Namely, the MME Serving Gateway 401 is the key control-node for the LTE access-network and is responsible for idle mode UE tracking and paging procedure including retransmissions. Also, the MME 401 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 4B:
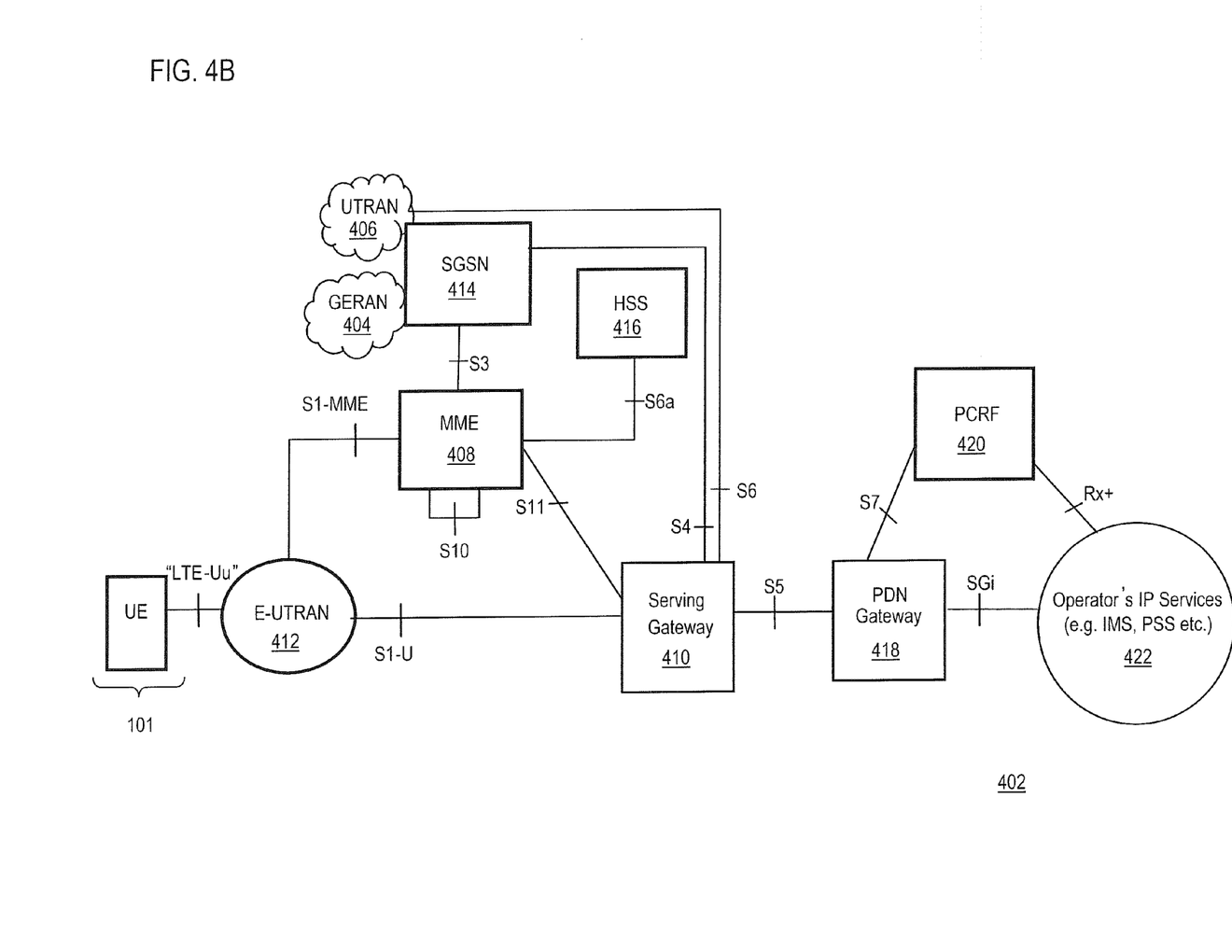

In FIG. 4B, a communication system 402 supports GERAN (GSM/EDGE radio access) 404, and UTRAN 406 based access networks, E-UTRAN 412 and non-3GPP (not shown) based access networks, and is more fully described in TR 23.882, which is incorporated herein by reference in its entirety. A key feature of this system is the separation of the network entity that performs control-plane functionality (MME 408) from the network entity that performs bearer-plane functionality (Serving Gateway 410) with a well defined open interface between them S11. Since E-UTRAN 412 provides higher bandwidths to enable new services as well as to improve existing ones, separation of MME 408 from Serving Gateway 410 implies that Serving Gateway 410 can be based on a platform optimized for signaling transactions. This scheme enables selection of more cost-effective platforms for, as well as independent scaling of, each of these two elements. Service providers can also select optimized topological locations of Serving Gateways 410 within the network independent of the locations of MMEs 408 in order to reduce optimized bandwidth latencies and avoid concentrated points of failure.

As seen in FIG. 4B, the E-UTRAN (e.g., eNB) 412 interfaces with UE 101 via LTE-Uu. The E-UTRAN 412 supports LTE air interface and includes functions for radio resource control (RRC) functionality corresponding to the control plane MME 408. The E-UTRAN 412 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 408, as a key control node, is responsible for managing mobility UE identifies and security parameters and paging procedure including retransmissions. The MME 408 is involved in the bearer activation/deactivation process and is also responsible for choosing Serving Gateway 410 for the UE 101. MME 408 functions include Non Access Stratum (NAS) signaling and related security. MME 408 checks the authorization of the UE 101 to camp on the service provider's Public Land Mobile Network (PLMN) and enforces UE 101 roaming restrictions. The MME 408 also provides the control plane function for mobility between LTE and 2G/3G access networks with the S3 interface terminating at the MME 408 from the SGSN (Serving GPRS Support Node) 414.

The SGSN 414 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 408 and HSS (Home Subscriber Server) 416. The S10 interface between MMEs 408 provides MME relocation and MME 408 to MME 408 information transfer. The Serving Gateway 410 is the node that terminates the interface towards the E-UTRAN 412 via S1-U.

The S1-U interface provides a per bearer user plane tunneling between the E-UTRAN 412 and Serving Gateway 410. It contains support for path switching during handover between eNBs 43. The S4 interface provides the user plane with related control and mobility support between SGSN 414 and the 3GPP Anchor function of Serving Gateway 410.

The S12 is an interface between UTRAN 406 and Serving Gateway 410. Packet Data Network (PDN) Gateway 418 provides connectivity to the UE 101 to external packet data networks by being the point of exit and entry of traffic for the UE 101. The PDN Gateway 418 performs policy enforcement, packet filtering for each user, charging support, lawful interception and packet screening. Another role of the PDN Gateway 418 is to act as the anchor for mobility between 3GPP and non-3GPP technologies such as WiMax and 3GPP2 (CDMA 1× and EvDO (Evolution Data Only)).

The S7 interface provides transfer of QoS policy and charging rules from PCRF (Policy and Charging Role Function) 420 to Policy and Charging Enforcement Function (PCEF) in the PDN Gateway 418. The SGi interface is the interface between the PDN Gateway and the operator's IP services including packet data network 422. Packet data network 422 may be an operator external public or private packet data network or an intra operator packet data network, e.g., for provision of IMS (IP Multimedia Subsystem) services. Rx+ is the interface between the PCRF and the packet data network 422.

Figure 4C:
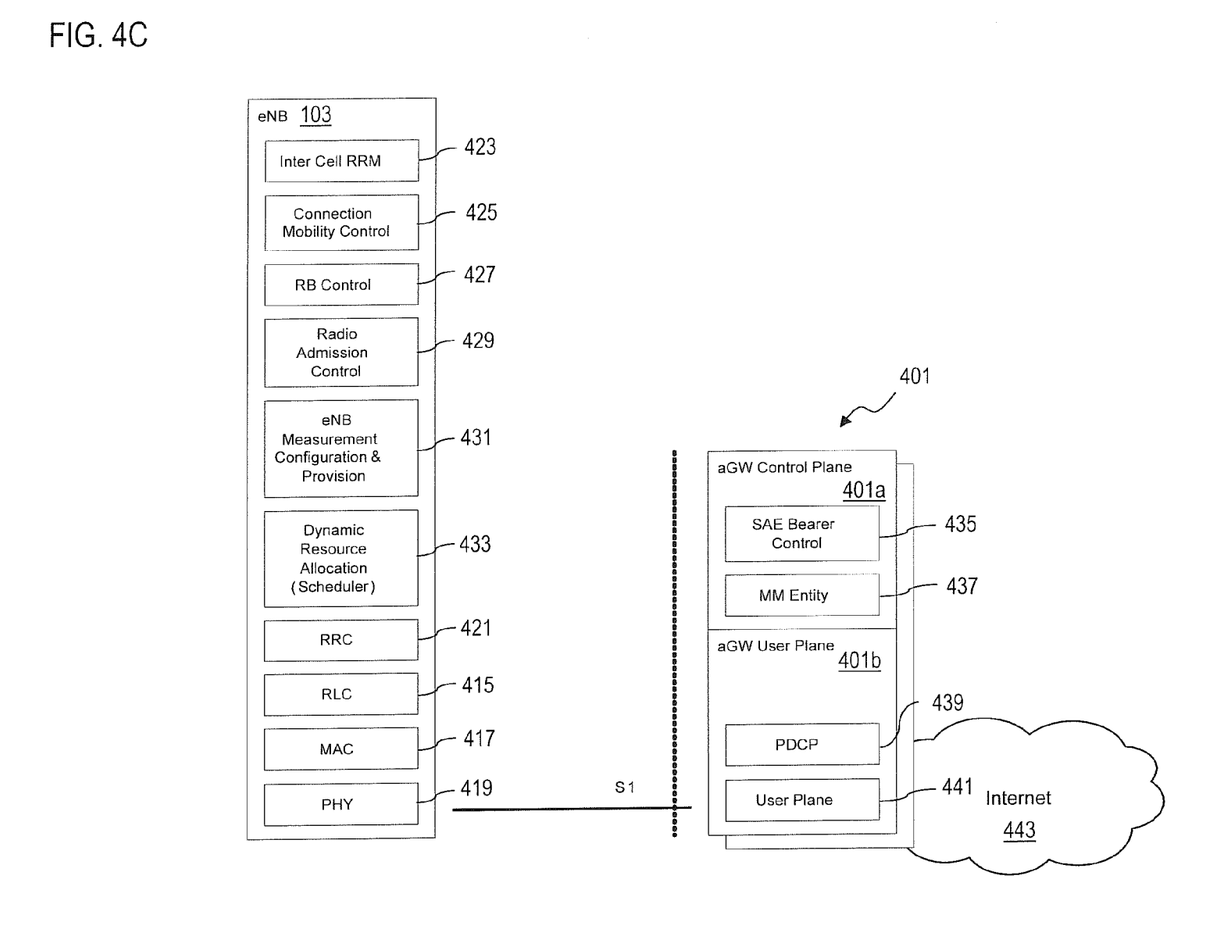

As seen in FIG. 4C, the eNB 43 utilizes an E-UTRA (Evolved Universal Terrestrial Radio Access) (user plane, e.g., RLC (Radio Link Control) 415, MAC (Media Access Control) 417, and PHY (Physical) 419, as well as a control plane (e.g., RRC 421)). The eNB 43 also includes the following functions: Inter Cell RRM (Radio Resource Management) 423, Connection Mobility Control 425, RB (Radio Bearer) Control 427, Radio Admission Control 429, eNB Measurement Configuration and Provision 431, and Dynamic Resource Allocation (Scheduler) 433.

The eNB 43 communicates with the aGW 401 (Access Gateway) via an S1 interface. The aGW 401 includes a User Plane 401*a* and a Control plane 401*b*. The control plane 401*b* provides the following components: SAE (System Architecture Evolution) Bearer Control 435 and MM (Mobile Management) Entity 437. The user plane 401*b* includes a PDCP (Packet Data Convergence Protocol) 439 and a user plane functions 441. It is noted that the functionality of the aGW 401 can also be provided by a combination of a serving gateway (SGW) and a packet data network (PDN) GW. The aGW 401 can also interface with a packet network, such as the Internet 443.

Figure 4D:
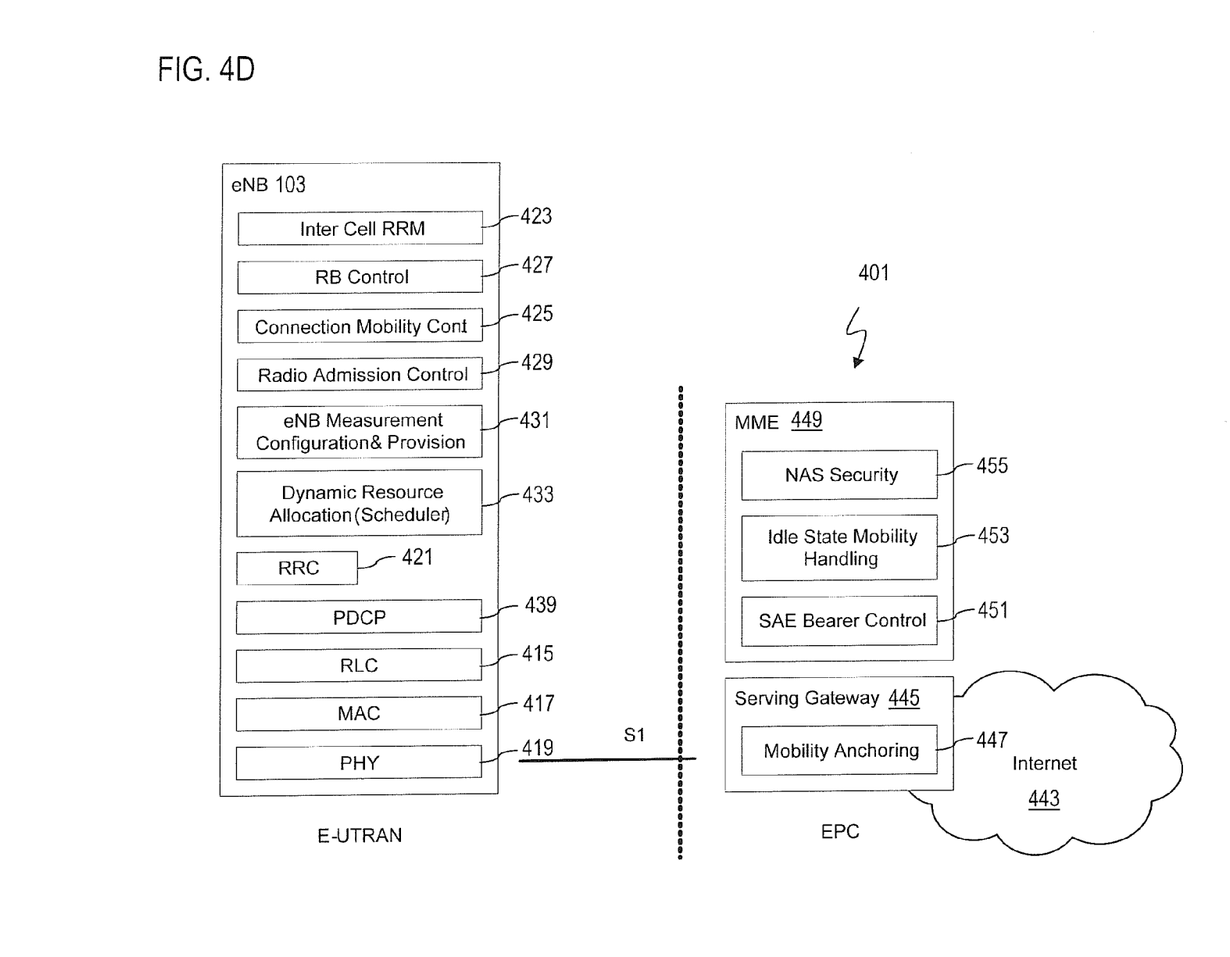

In an alternative embodiment, as shown in FIG. 4D, the PDCP (Packet Data Convergence Protocol) functionality can reside in the eNB 43 rather than the GW 401. Other than this PDCP capability, the eNB functions of FIG. 4C are also provided in this architecture.

In the system of FIG. 4D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 43 interfaces via the S1 to the Serving Gateway 445, which includes a Mobility Anchoring function 447. According to this architecture, the MME (Mobility Management Entity) 449 provides SAE (System Architecture Evolution) Bearer Control 451, Idle State Mobility Handling 453, and NAS (Non-Access Stratum) Security 455.

One of ordinary skill in the art would recognize that the processes for performing cell searches may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 5:
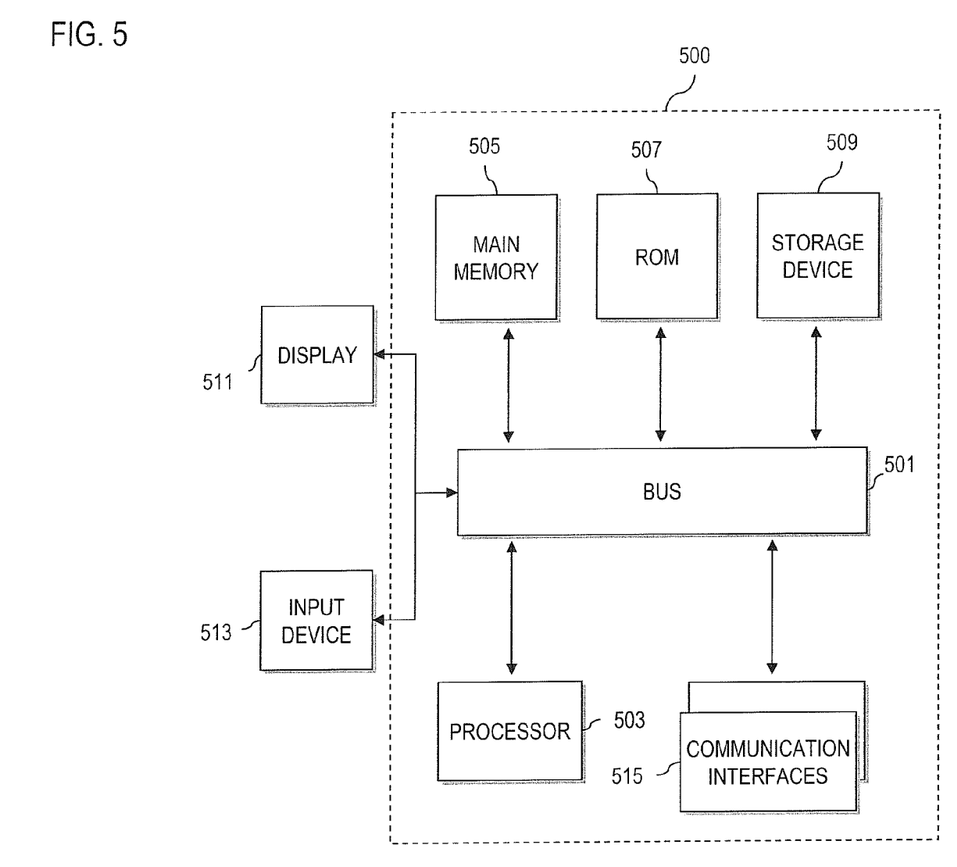
FIG. 5 is a diagram of hardware that can be used to implement an embodiment of the invention.
Figure 6:
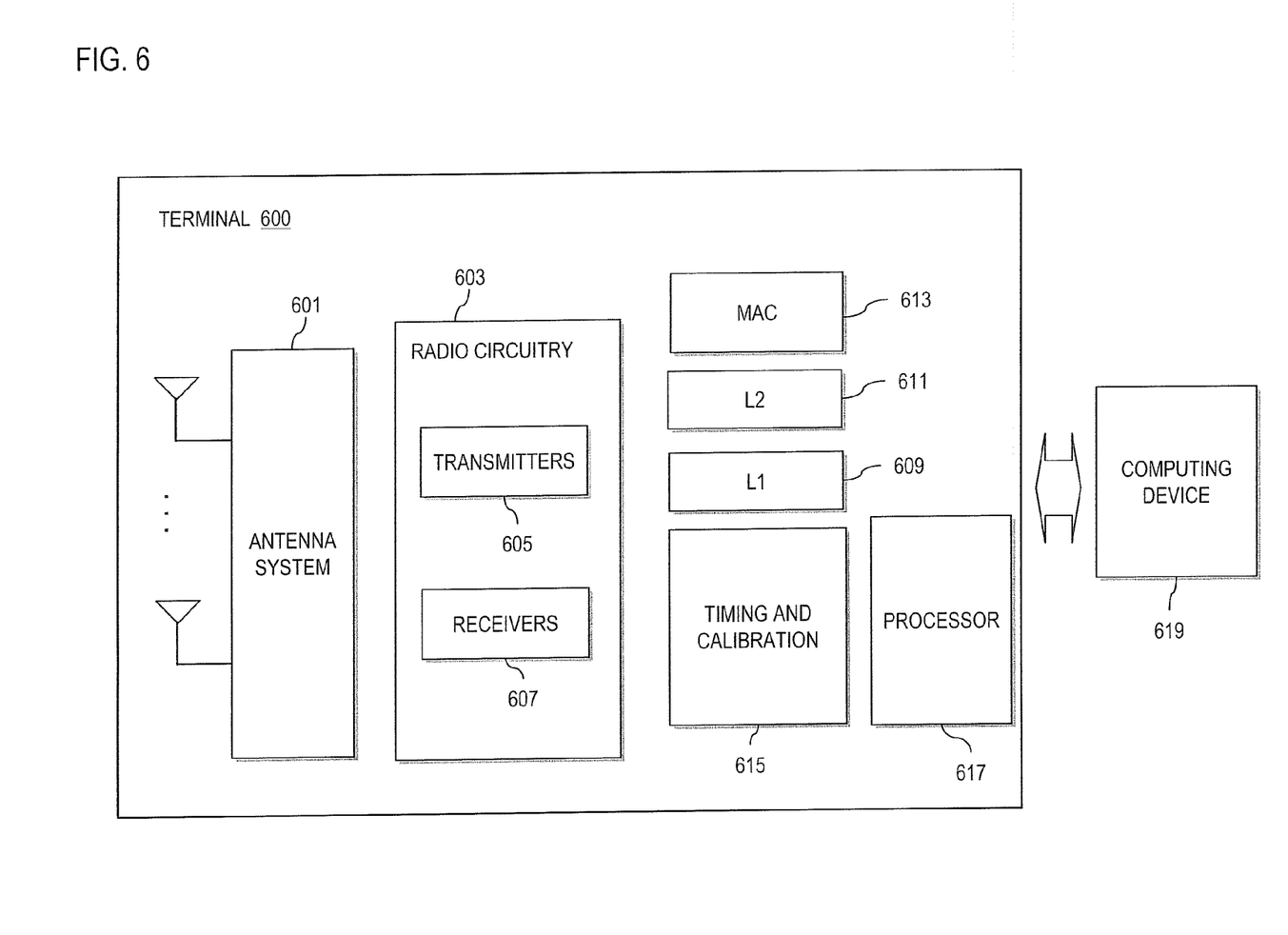
FIG. 6 is a diagram of exemplary components of a user terminal configured to operate in the systems of FIGS. 4A-4D, according to an embodiment of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled via the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 is a diagram of exemplary components of a user terminal configured to operate in the systems of FIGS. 4A-4D, according to an embodiment of the invention. A user terminal 800 includes an antenna system 801 (which can utilize multiple antennas) to receive and transmit signals. The antenna system 801 is coupled to radio circuitry 803, which includes multiple transmitters 805 and receivers 807. The radio circuitry encompasses all of the Radio Frequency (RF) circuitry as well as base-band processing circuitry. As shown, layer-1 (L1) and layer-2 (L2) processing are provided by units 809 and 811, respectively. Optionally, layer-3 functions can be provided (not shown). Module 813 executes all Medium Access Control (MAC) layer functions. A timing and calibration module 815 maintains proper timing by interfacing, for example, an external timing reference (not shown). Additionally, a processor 817 is included. Under this scenario, the user terminal 800 communicates with a computing device 819, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a network entity, that a user equipment is out of synchronization;
   sending towards the user equipment, by the network entity, a control signal specifying timing alignment information;
   declaring, by the network entity, an implicit negative acknowledgement for retransmission of data to the user equipment if an acknowledgement is not received within a predetermined time interval; and
   in response to determining that the user equipment is still out of synchronization, retransmitting the control signal until an acknowledgement is received.

2. The method according to claim 1, wherein the control signal is generated according to either a L1/L2 protocol or a medium access control layer protocol.

3. The method according to claim 1, wherein the retransmission is performed according to a hybrid automatic repeat request scheme.

4. The method according to claim 1, wherein the synchronization is with respect to an uplink.

5. The method according to claim 1, wherein the control signal further specifies use of the implicit negative acknowledgement.

6. The method according to claim 1, wherein the control signal further specifies use of an explicit negative acknowledgement.

7. At least one memory including computer program code, the computer program code executable by at least one processor to perform the method according to claim 1.

8. An apparatus comprising:
   at least one processor; and
   at least one memory including computer program code, where the at least one memory and the computer program code are configured, with the at least one processor, to cause the apparatus to at least:
   determine that a user equipment is out of synchronization and send towards the user equipment a control signal specifying timing alignment information;
   declare an implicit negative acknowledgement for retransmission of data to the user equipment if an acknowledgement is not received within a predetermined time interval; and
   in response to determining that the user equipment is still out of synchronization, retransmit the control signal until an acknowledgement is received.

9. The apparatus according to claim 8, wherein the control signal is generated according to either a L1/L2 protocol or a medium access control layer protocol.

10. The apparatus according to claim 8, wherein the retransmission is performed according to a hybrid automatic repeat request scheme.

11. The apparatus according to claim 8, wherein the synchronization is with respect to an uplink.

12. The apparatus according to claim 8, wherein the control signal further specifies use of the implicit negative acknowledgement.

13. The apparatus according to claim 8, wherein the control signal further specifies use of an explicit negative acknowledgement.

14. A method comprising:
    receiving, from a network entity, a control signal during an out of synchronization state, wherein the control signal specifies timing alignment information;
    performing an error check on the control signal; and
    if the error check passes, adjusting synchronization and generating an acknowledgement message, wherein a negative acknowledgement is implicitly declared if the error check fails and an acknowledgement message is not received within a predetermined time interval.

15. The method according to claim 14, wherein the control signal further specifies use of the implicit negative acknowledgement.

16. The method according to claim 14, wherein the control signal is generated according to either a L1/L2 protocol or a medium access control layer protocol, and the acknowledgement message is generated according to a hybrid automatic repeat request scheme.

17. At least one memory including computer program code, the computer program code executable by at least one processor to perform the method according to claim 14.

18. An apparatus comprising:
    at least one processor; and
    at least one memory including computer program code, where the at least one memory and the computer program code are configured, with the at least one processor, to cause the apparatus to at least:
    receive, from a network entity, a control signal during an out of synchronization state, wherein the control signal specifies timing alignment information;
    perform an error check on the control signal; and
    if the error check passes, adjust synchronization and generate an acknowledgement message, wherein a negative acknowledgement is implicitly declared if the error check fails and an acknowledgement message is not received within a predetermined time interval.

19. The apparatus according to claim 18, wherein the control signal further specifies use of the implicit negative acknowledgement.

20. The apparatus according to claim 18, wherein the control signal is generated according to either a L1/L2 protocol or a medium access control layer protocol, and the acknowledgement message is generated according to a hybrid automatic repeat request scheme.

* * * * *